(12) United States Patent
Singh

(10) Patent No.: US 7,964,170 B2
(45) Date of Patent: Jun. 21, 2011

(54) METHOD AND APPARATUS FOR THE REMOVAL OF CARBON DIOXIDE FROM A GAS STREAM

(75) Inventor: Uday Singh, San Clemente, CA (US)

(73) Assignee: FlueGen, Inc., Irvine, CA (US)

( * ) Notice: Subject to any disclaimer, the term of this patent is extended or adjusted under 35 U.S.C. 154(b) by 162 days.

(21) Appl. No.: 11/875,747

(22) Filed: Oct. 19, 2007

(65) Prior Publication Data

US 2009/0104098 A1    Apr. 23, 2009

(51) Int. Cl.
B01D 53/48     (2006.01)
B01J 31/00     (2006.01)

(52) U.S. Cl. .................................. 423/224; 502/172
(58) Field of Classification Search .................. None
See application file for complete search history.

(56) References Cited

U.S. PATENT DOCUMENTS

| | | | |
|---|---|---|---|
| 3,653,183 A | | 4/1972 | Sanders et al. |
| 3,711,593 A | | 1/1973 | Shick |
| 3,766,027 A | | 10/1973 | Gregory |
| 3,856,921 A | | 12/1974 | Shrier |
| 3,896,212 A | * | 7/1975 | Eickmeyer ................ 423/223 |
| 3,899,577 A | * | 8/1975 | Sugier ...................... 423/656 |
| 3,909,206 A | | 9/1975 | Katz |
| 3,932,587 A | * | 1/1976 | Grantham et al. ....... 423/244.08 |
| 4,041,129 A | | 8/1977 | Foster |
| 4,198,378 A | | 4/1980 | Giammarco |
| 4,251,494 A | | 2/1981 | Say |
| 4,282,194 A | | 8/1981 | Say |
| 4,291,004 A | | 9/1981 | McCaffery et al. |
| 4,488,866 A | | 12/1984 | Schirmer |
| 4,568,364 A | | 2/1986 | Galstaun et al. |
| 4,590,036 A | * | 5/1986 | Foroulis ..................... 422/13 |
| 4,626,418 A | | 12/1986 | College et al. |
| 4,670,237 A | | 6/1987 | Graf |
| 4,702,898 A | | 10/1987 | Grover |
| 4,783,325 A | | 11/1988 | Jones |
| 4,822,577 A | | 4/1989 | Epperly et al. |
| 4,859,438 A | | 8/1989 | Lindbauer |

(Continued)

FOREIGN PATENT DOCUMENTS

EP    0544515 A1    11/1992

(Continued)

OTHER PUBLICATIONS

Drage, T.C. et al. "Preparation of carbon dioxide absorbent from the chemical activation of urea-formaldehyde and melamine-formaldehyde resins" Fuel 86 (2007) 22-31.*

(Continued)

*Primary Examiner* — Melvin C Mayes
*Assistant Examiner* — Sheng H Davis
(74) *Attorney, Agent, or Firm* — Owens Tarabichi LLP

(57) ABSTRACT

The invention provides methods and apparatuses for removing carbon dioxide from a gas stream. In particular, the invention provides methods and apparatuses for absorbing carbon dioxide from a coal-fired boiler flue gas stream using an absorbing solution and for regeneration of an alkaline component used in the absorbing solution. In one embodiment, the invention provides a method for removing carbon dioxide from a gas stream by contacting a gas stream containing carbon dioxide with an alkaline liquid stream; absorbing at least a portion of the carbon dioxide into the alkaline liquid stream to produce absorbed carbon dioxide; and catalyzing a reaction of the: absorbed carbon dioxide to a form of carbonate.

4 Claims, 10 Drawing Sheets

U.S. PATENT DOCUMENTS

| | | | |
|---|---|---|---|
| 4,861,568 A | | 8/1989 | Robinson |
| 4,891,205 A | | 1/1990 | Bedell |
| 5,100,633 A | | 3/1992 | Morrison |
| 5,595,949 A | | 1/1997 | Goldstein |
| 5,635,150 A | | 6/1997 | Coughlin |
| 5,749,941 A | | 5/1998 | Jansen |
| 5,832,712 A | | 11/1998 | Rønning |
| 5,877,226 A | * | 3/1999 | Tsuda et al. .................... 521/76 |
| 5,980,848 A | | 11/1999 | Kresnyak et al. |
| 6,001,152 A | | 12/1999 | Sinha |
| 6,135,371 A | | 10/2000 | Csendes |
| 6,187,277 B1 | | 2/2001 | Kirschner |
| 6,312,655 B1 | * | 11/2001 | Hesse et al. .................... 423/232 |
| 6,558,454 B1 | | 5/2003 | Chang et al. |
| 6,635,415 B1 | | 10/2003 | Bollinger |
| 6,890,497 B2 | | 5/2005 | Rau et al. |
| 7,067,456 B2 | | 6/2006 | Fan |
| 7,070,758 B2 | | 7/2006 | Peterson |
| 7,132,090 B2 | | 11/2006 | Dziedzic et al. |
| 2001/0022952 A1 | * | 9/2001 | Rau et al. ...................... 422/169 |
| 2004/0062697 A1 | | 4/2004 | Mortson et al. |
| 2004/0166043 A1 | | 8/2004 | Vandine et al. |
| 2005/0201914 A1 | | 9/2005 | Ritzenthaler |
| 2006/0051274 A1 | | 3/2006 | Wright |
| 2006/0156923 A1 | * | 7/2006 | Meckl et al. .................... 95/236 |
| 2006/0185516 A1 | | 8/2006 | Moriyama et al. |
| 2006/0185985 A1 | | 8/2006 | Jones |
| 2006/0204401 A1 | | 9/2006 | McWhorter |
| 2006/0286011 A1 | | 12/2006 | Anttila |
| 2007/0219088 A1 | * | 9/2007 | Chigapov et al. .............. 502/303 |
| 2008/0072760 A1 | * | 3/2008 | Imada et al. .................... 96/145 |
| 2010/0074828 A1 | | 3/2010 | Singh |

FOREIGN PATENT DOCUMENTS

| | | | |
|---|---|---|---|
| EP | 1086738 B1 | | 8/2005 |
| EP | 1733782 | * | 6/2006 |
| EP | 1733782 A1 | | 12/2006 |
| JP | 54-020956 | | 2/1979 |
| WO | WO9507750 A1 | | 3/1995 |
| WO | WO0002646 A1 | | 1/2000 |
| WO | WO2006009600 A3 | | 4/2006 |
| WO | WO2007038605 A3 | | 4/2007 |

OTHER PUBLICATIONS

Chapel, Dan et al., Recovery of CO2 from Flue Gases: Commercial Trends, Canadian Society of Chemical Engineers Annual Meeting, Oct. 4-6, 1999, Saskatoon, Saskatchewan, Canada.

Bolland, O. et al., New Concepts for Natural Gas Fired Power Plants which Simplify the Recovery of Carbon Dioxide, Energy Conversation & Management, 1992, 467-475, vol. 33, No. 5-8.

Bagheri, Seyed Reza et al., Removal of the Gas Pollutants of a Thermal Oxidizer with a Dynamic Scrubber, Chem. Eng. Technol., 2007, 250-254, vol. 30, Issue 2.

Couvert, A. et al., Treatment of Odorous Sulphur Compounds by Chemical Scrubbing with Hydrogen Peroxide Application to a Laboratory Plant, Chem. Eng. Sci., 2006, 7240-7248, vol. 61, Issue 22.

Normandin, A. et al., Minimize Acid Content from Reactor Exit Gases, Hydrocarbon Process., Int. Ed., 2006, 75-78, 80, vol. 85, Issue 4.

Patented Technology Captures Carbon Dioxide from Power Plants, http://www.physorg.com/news4353.html, Jun. 1, 2005.

Rahmipour, M.R. et al., Enhanced Carbon Dioxide Removal by Promoted Hot Potassium Carbonate in a Split-Flow Absorber, Chemical Engineering and Processing, 2004, 857-865, 43(7).

Drage, T.C. et al., Preparation of carbon dioxide adsorbents from the chemical activation of urea-formaldehyde and melamine-formaldehyde resins, Fuel 86 (2007) 22-31, Elsevier, Aug. 14, 2006.

\* cited by examiner

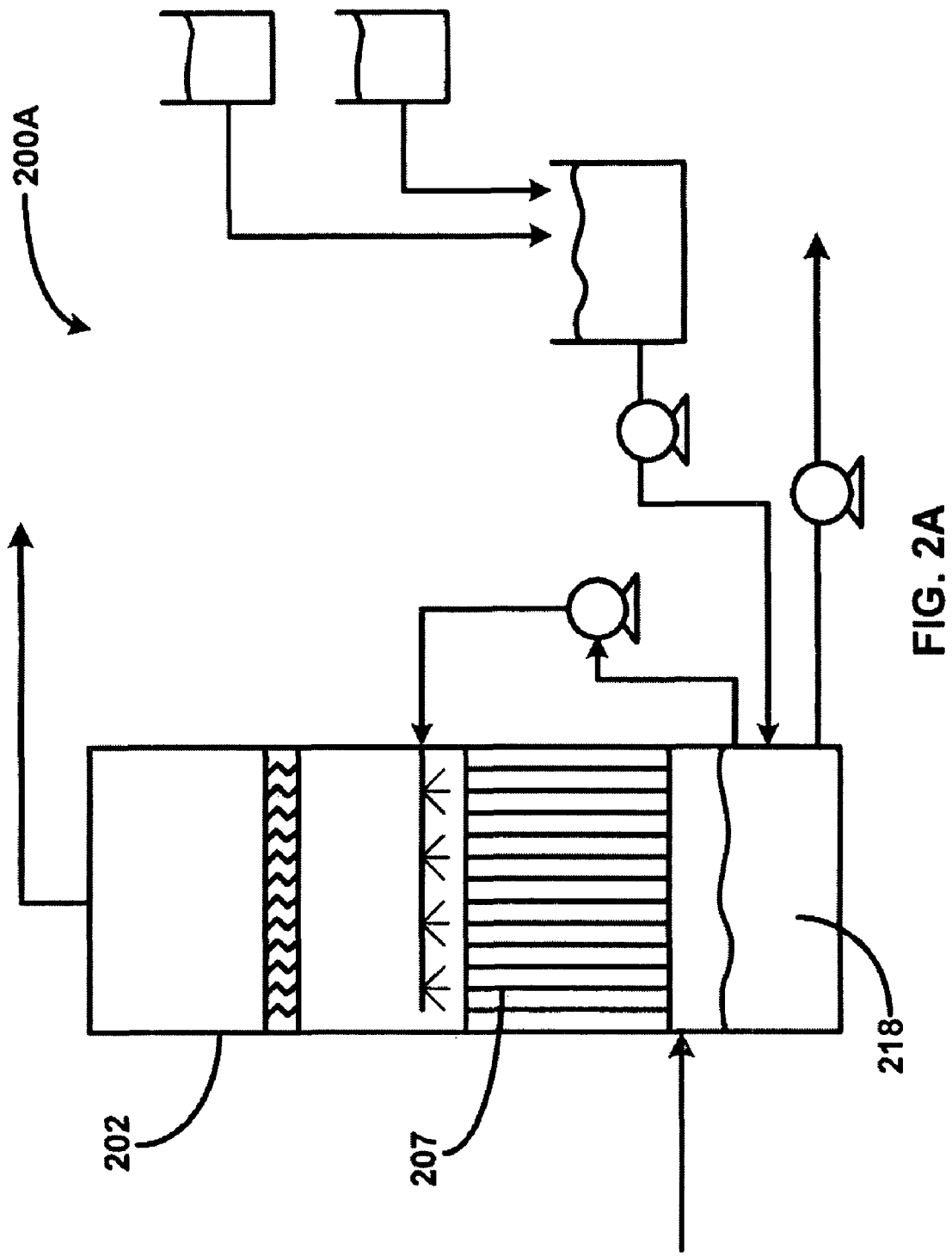

METHOD AND APPARATUS FOR THE REMOVAL OF CARBON DIOXIDE FROM A GAS STREAM

BACKGROUND

1. Background of the Invention

The invention relates generally to methods and apparatuses for removing carbon dioxide from a gas stream. In particular, the invention relates to methods and apparatuses for absorbing carbon dioxide from a coal-fired boiler flue gas stream using an absorbing solution and for regeneration of an alkaline component used in the absorbing solution.

2. Description of Related Art

Certain gaseous or vapor phase pollutants are routinely removed from gas streams emitted by various sources, such as power, chemical, and manufacturing plants, before such gas streams are released into the atmosphere. For example, sulfur dioxide is routinely removed from flue gas generated by coal-fired power plants. However, concerns have recently arisen about the release of carbon dioxide into the atmosphere from various sources such as coal-fired power plants. Specifically, carbon dioxide has been identified as a greenhouse gas and as a contributor to global warming. Accordingly, it is desirable to reduce carbon dioxide emissions, for example, by removing it from gas streams emitted by these various sources, such as coal-fired power plants. While there are various technologies available for removing carbon dioxide from a gas stream, improvements in removal efficiency and cost can still be achieved, and new technologies still need to be developed.

SUMMARY OF THE INVENTION

The invention provides methods and apparatuses for removing carbon dioxide from a gas stream. In particular, the invention provides methods and apparatuses for absorbing carbon dioxide from a coal-fired boiler flue gas stream using an absorbing solution and for regeneration of an alkaline component used in the absorbing solution.

In one embodiment, the invention provides a method for removing carbon dioxide from a gas stream, comprising contacting a gas stream containing carbon dioxide with an alkaline liquid stream; absorbing at least a portion of the carbon dioxide into the alkaline liquid stream to produce absorbed carbon dioxide; and catalyzing a reaction of the absorbed carbon dioxide to a form of carbonate. The invention also provides various apparatuses for use in performing the method of the invention. Other embodiments and features of the invention are described in more detail below in connection with the Figures.

BRIEF DESCRIPTION OF THE DRAWINGS

FIG. 2A illustrates a process comprising a wet electrostatic precipitator as a carbon dioxide absorber and related process equipment for implementing another embodiment of the present invention;

DETAILED DESCRIPTION OF THE INVENTION

Generally, the invention comprises various methods and apparatuses for removing carbon dioxide from a gas stream using an absorbing solution and for regeneration of an alkaline component used in the absorbing solution. The various embodiments are described below in conjunction with the Figures; however, this description should not be viewed as limiting the scope of the present invention. Rather, it should be considered exemplary of various embodiments that fall within the scope of the present invention as defined by the claims. For example, the various embodiments of the invention are described below in the context of the removal of carbon dioxide from a flue gas stream generated by a coal-fired boiler. However, the various methods and apparatuses for removing carbon dioxide can be applied to any gas stream generated by any means or from any source.

Figure 1:
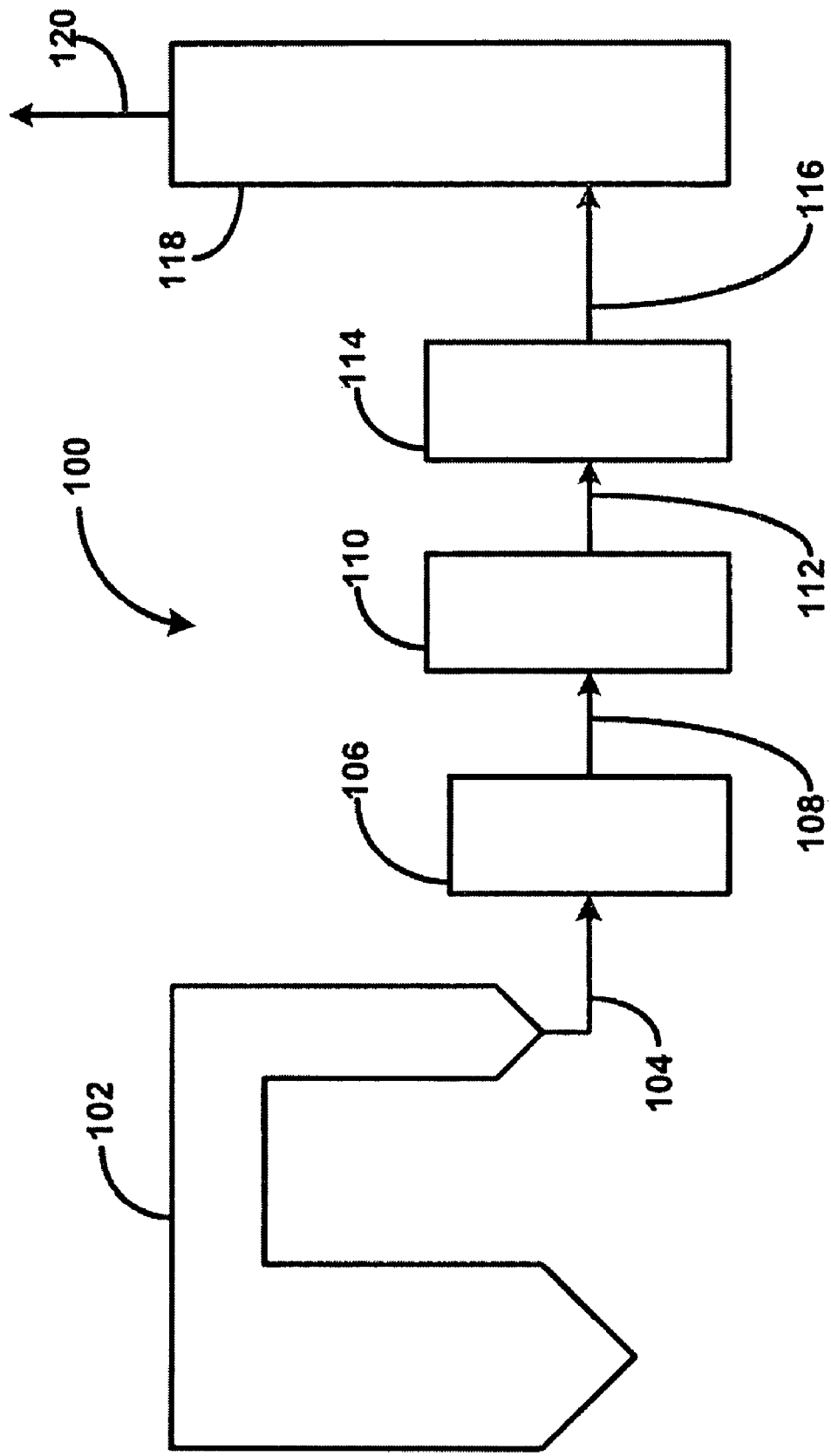
FIG. 1 illustrates a coal-fired boiler and flue gas treatment process incorporating an embodiment of the present invention.

FIG. 1 illustrates a coal-fired boiler and flue gas treatment process incorporating an embodiment of the present invention. The coal-fired boiler and flue gas treatment process 100 comprises a coal-fired boiler 102 that combusts coal to produce steam for use in generating electricity. The combustion process produces a flue gas comprising certain components that need to be removed, at least partially, from the flue gas before it is released into the atmosphere. Some of these components include fly ash or particulate matter, sulfur dioxide, and carbon dioxide, as well as other trace contaminants such as mercury.

The flue gas exits the boiler 102 through a boiler outlet gas duct 104 that carries the flue gas to a particulate collection device 106. The particulate collection device 106 removes at least a portion of the fly ash or particulate matter from the flue gas. The particulate collection device 106 may be any device capable of removing the fly ash or particulate matter, such as a wet electrostatic precipitator, a dry electrostatic precipitator, or a baghouse fabric filter. It should be appreciated that the amount of fly ash or particulate matter removal may vary. For example, the concentration of the fly ash or particulate matter in the flue gas and the type and operating conditions of particulate collection device 106, as well as other operating parameters and conditions, may each affect the amount of fly ash or particulate matter removed from the flue gas. The flue gas exits the particulate collection device 106 through a particulate collection device outlet gas duct 108 that carries the flue gas to a sulfur dioxide absorber 110.

The sulfur dioxide absorber 110 removes at least a portion of the sulfur dioxide from the flue gas. The sulfur dioxide absorber 110 may be any gas/liquid contactor capable of removing sulfur dioxide from the flue gas, such as a spray tower, tray tower, or a packed bed tower. The sulfur dioxide absorber 110 may also be a spray dryer; however, in this case a particulate collection device would be positioned downstream of the spray dryer rather than upstream as shown in FIG. 1. Various reagents may be used in each of these contactors, including lime and limestone, as well as other additives used in conjunction with these reagents, such as oxidation and pH control additives. It should be appreciated that the amount of removal of sulfur dioxide may vary. For example, the concentration of sulfur dioxide in the flue gas and the type and operating conditions of sulfur dioxide absorber 110, as well as other operating parameters and-conditions, may each affect the amount of sulfur dioxide removed. The flue gas exits the sulfur dioxide absorber 110 through a sulfur dioxide absorber outlet gas duct 112 that carries the flue gas to a carbon dioxide absorber 114.

The carbon dioxide absorber 114 removes at least a portion of the carbon dioxide from the flue gas using an alkaline liquid stream or slurry, generally referred to below as an absorbing solution. In some embodiments, 90% or more, 95% or more, or 99% or more of the carbon dioxide is removed. The carbon dioxide absorber 114 may be any gas/liquid contactor capable of removing carbon dioxide from the flue gas, such as a spray tower, tray tower, packed bed tower, or a spray dryer, and such gas/liquid contactor may be designed for vertical or horizontal gas flow and for either countercurrent, co-current or cross-current gas flow relative to the flow of the absorbing solution. It should be appreciated that a wet electrostatic precipitator may also be used as the carbon dioxide absorber, in which case the concurrent removal of both carbon dioxide: and sulfur trioxide maybe achieved. Various embodiments and aspects of the carbon dioxide absorber 114, including its configuration and operation are described further below in connection with FIGS. 2-6. The flue gas exits the carbon dioxide absorber 114 through a carbon dioxide absorber outlet duct 116 that carries the flue gas to a stack 118. The flue gas 120 exits the stack 118 where it is discharged to the atmosphere.

Figure 2:
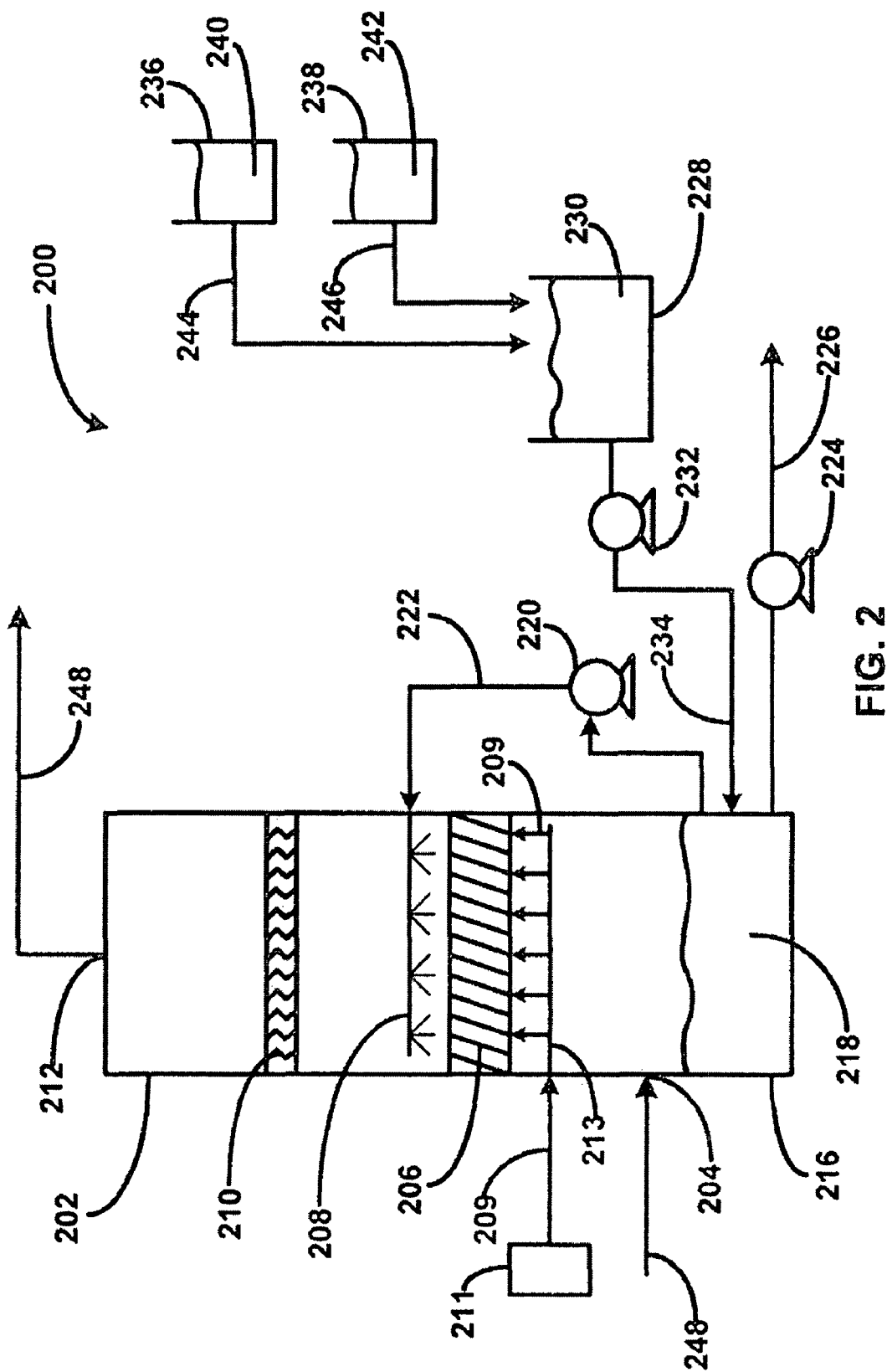
FIG. 2 illustrates a process comprising a carbon dioxide absorber and related process equipment for implementing an embodiment of the present invention.

FIG. 2 illustrates a process comprising a carbon dioxide absorber and related process equipment for implementing an embodiment of the present-invention. The process 200 comprises a carbon dioxide absorber 202, illustrated as a packed bed absorber, that contacts the flue gas with an alkaline liquid stream or slurry, generally referred to as an absorbing solution, to absorb carbon dioxide from the flue gas. The packed bed absorber 202 is one example of the carbon dioxide absorber 114 illustrated in FIG. 1; however, other absorber designs, such as a spray tower, tray tower, packed bed tower, a spray dryer, or a wet electrostatic precipitator may be used. The packed bed absorber 202 comprises a flue gas inlet duct 204, a packed bed 206, a bank of nozzles 208, a mists eliminator 210 positioned above the packed bed 206 and the nozzles 208, and a flue gas outlet duct 212. Again, it should be appreciated that the packed bed absorber 202 or any other absorber design, including a wet electrostatic precipitator, may be used to remove carbon dioxide from other types of gas streams and is not limited to use with flue gas streams from coal-fired boilers.

The packed bed 206 may be any packed bed known in the art, including any packing material known in the art, that provides sufficient gas/liquid contact between the flue gas and the absorbing solution. In some embodiments, high efficiency packing with low pressure drop across the packing may be used to minimize the size and operating costs of the packed bed. The nozzles 208 may also be any type of nozzle or any other equipment capable of distributing an absorbing solution over the packed bed 204. In some embodiments, a gas 209 from a gas source 211 optionally may be injected through a gas manifold 213 into the bottom of the packed bed 206 to provide agitation to the gas and liquid in the packed bed 206, thereby increasing the amount of contact between the gas and the liquid. This gas 209 may be a compressed gas, such as compressed ambient air, or any other gas provided such gas does not deleteriously affect the operation of the packed bed 206 or the carbon dioxide absorber 202. The mist eliminator 210 may also be any mist eliminator design known in the art, including a wet electrostatic precipitator.

The bottom of the packed bed absorber 202 serves as a reaction tank 216 that collects the absorbing solution 218. An absorbing solution recirculation pump 220 is used to recirculate the absorbing solution 218 through a recirculation line 222 that extends from the reaction tank 216 to the nozzles 208. A blow down pump 224 is used to discharge a portion of the absorbing solution 218 from the reaction tank 216 through a discharge or blow down line 226.

A reagent feed tank 228 is used-to bold an alkaline reagent 230 that is added to the absorbing solution. A reagent feed pump 232 is used to feed the reagent 230 to the reaction tank 216 through a reagent feed line 234. Chemical feed tanks 236, 238 are used to hold various chemical solutions 240, 242, respectively, that are added to the reagent 230 in the reagent feed tank 228 through chemical feed lines 244, 246, respectively. In one embodiment, one of the chemical solutions 240 comprises an alkaline component that is added to the reagent feed tank 228 to provide the reagent 230 with its alkalinity. In other words, one component of-the reagent 230 is an alkaline component. Accordingly, as the reagent 230 is fed to the reaction tank 216, the alkaline component will also be added to the absorbing solution 218. It-should be appreciated that additional process equipment, such as surge tanks necessary to maintain an appropriate pressure head for the various pumps may also be used.

In operation, a flue gas 248 comprising carbon dioxide, such as a flue gas from a coal-fired boiler, enters the packed bed absorber 202 at the flue gas inlet duct 204 and travels through the packed bed 206, through the mist eliminator 210, and through the flue gas outlet duct 212. Concurrently with the flow of the flue gas 248 through the packed bed absorber 202, the absorbing solution 218 is continuously pumped from the reaction tank 216 through the recirculation line 222 using the absorbing solution recirculation pump 220 to deliver the absorbing solution to the bank of nozzles 208. As the absorbing solution 218 exits the nozzles 208, the absorbing solution 218 is distributed over the top of the packed bed 206. The absorbing solution 2 18 travels through the packed bed 206 and is collected in the reaction tank 216 at the bottom of the packed bed absorber 202. In this embodiment, the direction of gas flow and the direction of flow of the absorbing solution are countercurrent. However, it should be appreciated that the relative direction of the gas flow and absorbing solution flow may be co-current or cross-current depending upon the absorber design. Moreover, it should be appreciated that the gas flow may also be vertical (upward or downward) or horizontal relative to the ground depending upon the absorber design.

As the flue gas 248 passes through the packed bed 206 and as the absorbing solution 218 travels through the packed bed 206, the flue gas 248 and the absorbing solution 218 are brought into intimate contact. During this contact, carbon dioxide is absorbed from the flue gas 248 into the absorbing solution 218. One of skill in the art will appreciate that the amount of gas/liquid contact is based upon the design of the packed bed 206 and the type of packing material used, as well as the relative flow rates of the flue gas 248 and the absorbing solution 218 through the packed bed absorber 202 and the packed bed 206.

Upon absorption of the carbon dioxide into the absorbing solution 218, the absorbed carbon dioxide will initially react with water in the absorbing solution to produce carbonic acid. Accordingly, the pH of the absorbing solution 218 will decrease as more and more carbon dioxide is absorbed. Therefore, it is desirable to use an absorbing solution 218 that is alkaline to increase the capacity of the absorbing solution to absorb carbon dioxide. In addition, it is desirable to maintain and control the amount of alkalinity in the absorbing solution 218 as carbon dioxide is absorbed. In one embodiment, the amount of alkalinity in the absorbing solution 218 is determined using a pH measurement, and the amount alkalinity in the absorbing solution 218 is maintained by controlling the pH of the absorbing solution 218 at a predetermined value as described below.

The amount of alkalinity and, therefore, the pH to be maintained in the absorbing solution may vary depending upon a variety of factors, including, for example, the concentration of the carbon dioxide in the flue gas 218, the desired amount of carbon dioxide removal from the flue gas 218, and the actual amount of carbon dioxide removed. In some embodiments, the pH of the absorbing solution 218 is controlled at approximately 7.0 or greater and in some embodiments between approximately 8.0 to approximately 11.0. At a pH of approximately 8.3-8.5, there is no carbon dioxide off-gassing from the absorbing solution. Therefore, in other embodiments, the pH of the absorbing solution is controlled at approximately 8.3 or greater, approximately 8.5 or greater, or between approximately 8.3 to approximately 8.5.

In one embodiment, the pH of the absorbing solution 218 is controlled by the addition of the alkaline reagent 230 to the absorbing solution 218, which is done by feeding the reagent 230 to the reaction tank 216 based upon a pH feedback control loop (not shown). In this embodiment, the pH of the absorbing solution 218 is measured, and, as the pH drops below a predetermined value, the reagent 230 is added to the absorbing solution 218 via the reaction tank-216. The pH may be measured in the reaction tank 216 or in the recirculation line 222. Alternatively, the reagent 230 may be added to the recirculation line 222.

The alkaline reagent 230 comprises at least water and an alkaline component and, in one embodiment, may be generated by mixing water and the alkaline component in the reagent feed tank 228. The alkaline component may be any alkaline chemical or mixture of alkaline chemicals that will provide alkalinity to the absorbing solution 218 and thereby allow for control of the pH of the absorbing solution. In one embodiment, the alkaline component is sodium hydroxide. In another embodiment, the alkaline component is calcium hydroxide. In other embodiments, the alkaline component may be either sodium hydroxide, calcium hydroxide, and an additional alkaline chemical or a mixture of any of the foregoing. The alkaline component may be held in one of the chemical feed tanks 236 and added to the reagent feed tank 228 when necessary. In other words, whenever reagent 230 is needed, or if the amount of reagent 230 in the reagent feed tank 228 has fallen below a predetermined level, water and the alkaline component may be added to the reagent feed tank 228 and mixed to produce the reagent 230.

One of skill in the art will appreciate that the concentration of the alkaline component in the reagent 230 may vary depending upon various factors, including the amount of carbon dioxide removal and the corresponding rate at which the reagent 230 must be added to the absorbing solution 218 to maintain a given pH, as well as the overall material balance, including the water balance, of the overall process 200 or the process in which the packed bed absorber 202 is used, such as the process shown in FIG. 1. Accordingly, the concentration of the alkaline component 240 in the chemical feed tank 236 can also be adjusted depending upon these factors. In the embodiment wherein the alkaline component comprises sodium hydroxide, the concentration of the sodium hydroxide 240 in the chemical feed tank 236 ranges from approximately 0.1N to approximately 4N sodium hydroxide and in other embodiments from approximately 1N to approximately 2N sodium hydroxide. In the embodiment wherein the alkaline component comprises calcium hydroxide, the solution in the chemical feed tank 236 will be a slurry comprising calcium hydroxide solids at a concentration ranging from approximately 10% by weight solids to approximately 12% by weight solids. When using calcium hydroxide as the alkaline component in the reagent, it should be appreciated that the absorbing solution will also contain solids and may be referred to as a slurry.

In the embodiment in which the alkaline component 240 comprises sodium hydroxide, the absorption of carbon dioxide and its reaction with the absorbing solution 218 comprising sodium hydroxide is shown by Equations (1)-(3):

$$CO_2(g)+H_2O(l) \leftrightarrow H_2CO_3(l) \qquad \text{Eq. (1)}$$

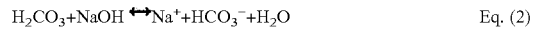

$$H_2CO_3+NaOH \leftrightarrow Na^+ + HCO_3^- + H_2O \qquad \text{Eq. (2)}$$

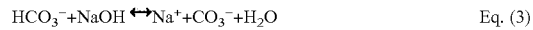

$$HCO_3^- + NaOH \leftrightarrow Na^+ + CO_3^= + H_2O \qquad \text{Eq. (3)}$$

As shown, the absorbed carbon dioxide gas reacts with water to form carbonic acid followed by the liquid phase reactions with the sodium hydroxide to form a mixture of both sodium bicarbonate (Eq. 2) and sodium carbonate (Eq. 3). It should be appreciated that the bicarbonate and carbonate are in equilibrium with each other based upon the pH of the absorbing solution. Therefore, while these reactions are reversible, at approximately pH 8.3, there is a reduced amount of carbonic acid in the absorbing solution, as Equation (2) is shifted in favor of the formation of sodium bicarbonate. Accordingly, at this pH or higher there would be no off-gassing of carbon dioxide.

In the embodiment in which the alkaline component 240 comprises calcium hydroxide, the absorption of carbon dioxide and its reaction with the absorbing solution 218 comprising calcium hydroxide is shown by Equations (4)-(6):

$$CO_2(g)+H_2O(l) \leftrightarrow H_2CO_3(l) \qquad \text{Eq. (4)}$$

$$2\,H_2CO_3+Ca(OH)_2 \leftrightarrow Ca^{++} + 2HCO_3^- + 2H_2O \qquad \text{Eq. (5)}$$

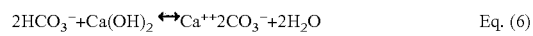

$$2HCO_3^- + Ca(OH)_2 \leftrightarrow Ca^{++} + 2CO_3^= + 2H_2O \qquad \text{Eq. (6)}$$

As shown, the absorbed carbon dioxide gas reacts with water to form carbonic acid followed by the liquid phase reactions with dissolved calcium hydroxide to form a mixture of both calcium bicarbonate (Eq. 2) and calcium carbonate (Eq. 3). While these reactions are reversible, at a pH of approximately 8.2 to approximately 8.3 there is a reduced amount of carbonic acid in the absorbing solution, as Equation (2) is shifted in favor of the formation of calcium bicarbonate. Accordingly, at this pH range and higher there would be no off-gassing of carbon dioxide.

Once the process 200 reaches steady-state operation, the absorbing solution 218 will contain certain concentrations of bicarbonate and carbonate ions and the corresponding cations depending upon the alkaline component used. As noted above, the use of calcium hydroxide as the alkaline component will result in calcium as the primary cation. In this case, the absorbing solution 218 will also comprise solids. Also, it should be appreciated that the absorbing solution 218 may also comprise other chemicals in significant or trace concentrations depending upon such factors as the amount of particulate matter or fly ash and other gaseous species removed by the packed bed absorber 202 from the flue gas 248 and the amount of other chemicals that enter the system with the reagent 230 or water used in the reagent 230. Therefore, the absorbing solution 218 may contain other liquid phase chemicals as well as other solids. Accordingly, the terms "alkaline liquid stream" and "absorbing solution" are intended to include liquid streams, as well as liquid streams comprising solids, such as slurries.

In one embodiment, one of the chemical feed tanks 238 may be used to hold a catalyst 242 that is optionally added to the reagent feed tank 230 and fed to the absorbing solution 218 with the reagent 230. This catalyst 242 is used to catalyze the absorption of carbon dioxide. Without being limited by theory, it is believed that the carbon dioxide absorption rate is limited more by the relatively low rate of reaction of the carbon dioxide in the liquid phase after it has been absorbed than by its diffusion rate through the gas film and the gas-liquid interface. Therefore, the reaction rate within the liquid phase is increased by the use of catalyst. In particular, it is believed that the catalyst increases the rate of reaction of the carbonic acid and the bicarbonate with the alkaline component, as shown by Equations (2) and (3) and Equations (5) and (6) above.

The catalyst, however, may be any catalyst that increases the rate of absorption of carbon dioxide. In some embodiments, the catalyst comprises a monosaccharide, such as levulose or dextrose. In other embodiments, the catalyst comprises a disaccharide, such as sucrose and lactose. In other embodiments, the catalyst comprises an alcohol, such as ethylene glycol, glycerol, methyl alcohol, and ethyl alcohol. In other embodiments, the catalyst comprises an aldehyde, such as formaldehyde. In other embodiments, the catalyst comprises a mixture of any of a monosaccharide, a disaccharide, an alcohol, and an aldehyde. In other embodiments, the catalyst comprises sucrose, dextrose, ethanol, methanol, ethylene glycol, levulose, glycerol, lactose, and any mixture or combination of any of the foregoing.

As noted, the catalyst may be added to the reagent feed tank 228 from a chemical feed tank 238. Alternatively, the catalyst may be added directly to the reaction tank 216, directly to the recirculation line 222 separately from the reagent feed line 234, or directly to the alkaline component 240 being held in one of the chemical feed tanks 236. The concentration of catalyst necessary in the absorbing solution 218 is any amount that improves the rate of removal of carbon dioxide removal from the flue gas 248, which can be determined simply by measuring the amount of carbon dioxide removal across the packed bed absorber 202. Furthermore, the actual concentration of the catalyst in the absorbing solution 218 may not need to be measured, as one of skill in the art will appreciate that various concentrations of the catalyst in the chemical feed tank 238 and various rates of addition of the catalyst to either the reagent feed tank 230 or to the reaction tank 216 or the recirculation line 222 may be used to determined the absolute amount and rate of catalyst that needs to be fed to the absorbing solution 218 to enhance the rate of carbon dioxide removal. In some embodiments, the concentration of the catalyst is approximately 0.01% to approximately 1.0% of the absorbing solution.

As the process 200 continues to operate, the absorbing solution is recirculated multiple times or makes multiple passes through the absorber 202. During each pass, an additional increment of carbon dioxide is absorbed resulting in the formation of more bicarbonate and carbonate that must, be removed from the absorption solution and replaced by the addition of reagent and fresh alkaline component to maintain the a desired reactivity or alkalinity of the absorbing solution. This is accomplished by discharging a portion of the absorbing solution 218 through the blow down line 226 at a selected rate. This discharge or blow down stream is ultimately passed to a set of hydroclones and thickeners or to a storage tank (not shown) for ultimate disposal. It should be appreciated that the concentration of the catalyst in the blow down stream will be relatively low since the concentration in the absorbing solution 218 is also relatively low. Therefore, disposal of the blow down stream comprising a low concentration of catalyst should not present any particular disposal issues.

As noted above, the embodiments shown in FIG. 2 have been described in the context of removing carbon dioxide from a flue gas generated by a coal-fired boiler. It should be appreciated that in using the various embodiments of the present invention for flue gases that also comprise sulfur dioxide, such as a flue gas from a coal-fired boiler, a sulfur dioxide absorber, as shown in FIG. 1 should be utilized upstream of the carbon dioxide absorber. It is important to remove the sulfur dioxide before attempting to remove the carbon dioxide with an alkaline absorbing solution, since otherwise the presence of a significant amount of sulfur dioxide will be preferentially absorbed before the carbon dioxide, thereby consuming a significant portion of the alkalinity of the absorbing solution.

FIG. 2A illustrates a: process comprising a wet electrostatic precipitator as a carbon dioxide absorber and related process equipment for implementing another embodiment of the present invention. This embodiment is similar to that shown in FIG. 2, except that a wet electrostatic precipitator 207 is used in the absorber 202 in place of the packed bed 206. One advantage of using a wet electrostatic precipitator for the removal of carbon dioxide is that sulfur trioxides may also be removed. It is well known in the industry that sulfur trioxides are not removed in the particulate collection device 106 or the sulfur dioxide absorber 110, and as a result are exhausted through the stack 118. Because sulfur trioxides react with water vapor in the atmosphere to produce sulfuric acid mist, and since this mist deposits in regions around the power plant, removal of sulfur trioxides from the flue gas is receiving increasing regulatory scrutiny. Therefore, it is desirable to remove sulfur trioxides from the flue gas.

A wet electrostatic precipitator uses a high voltage, direct current field of between 45,000 volts to 60,000 volts applied to discharge electrodes to ionize the flue gas, producing a corona around these electrodes. Each discharge electrode is enclosed within a tubular collection electrode that is connected to ground. The ions produced migrate to the collection electrodes and in the process come into contact with pollutants, including sulfur trioxides, imparting a charge to these and causing them to migrate to the collecting electrodes. These collected pollutants are flushed from the electrodes by a film of water, effectively removing them from the flue gas.

In addition, a wet electrostatic precipitator may be used to oxidize and absorb vaporous mercury in the flue gas. In this case, it is believed that the corona (if oscillated between an alternating current and a direct current) will oxidize the elemental form of mercury (which is difficult to remove in any of the collection devices described) to an oxidized form, which is known to be readily removed. Therefore, the use of a wet electrostatic precipitator may provide the advantage of removing carbon dioxide, sulfur trioxides, and mercury from a flue gas stream.

In the process 200A shown in FIG. 2A, the absorber 202 and all of the related equipment is the same as that shown in FIG. 2, except, as noted, that the absorber 202 comprises a wet electrostatic precipitator 207 instead of a packed bed 206. In this case the absorbing solution 218 is distributed over the top of the wet electrostatic precipitator 207, and carbon dioxide is absorbed as the absorbing solution 218 travels through the wet electrostatic precipitator 207.

Figure 3:
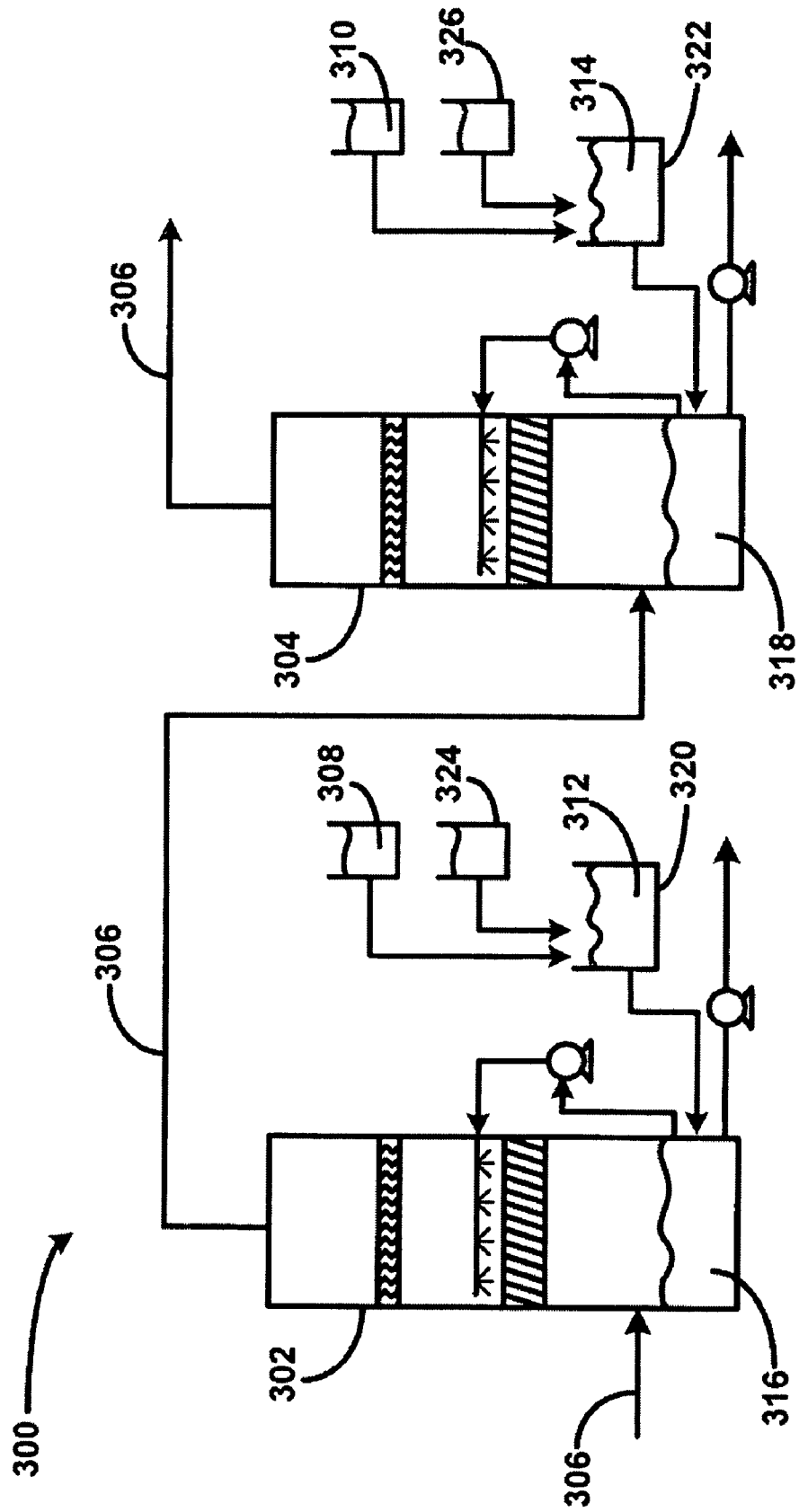
FIG. 3 illustrates a series of carbon dioxide absorbers and related process equipment for implementing another embodiment of the present invention.

FIG. 3 illustrates a series of carbon dioxide absorbers and related process equipment for implementing another embodiment of the present invention. In this process 300, two carbon dioxide absorbers 302, 304, shown as packed bed absorbers, are used in series to remove carbon dioxide in two stages from a gas stream 306. In this embodiment, the gas stream 306 comprising carbon dioxide enters the first packed bed absorber 302, where a portion of the carbon dioxide is removed from the gas stream 306. Upon exiting the first packed bed absorber 302, the gas stream 306 is passed to the second absorber 304 where an additional portion of the carbon dioxide is removed from the gas stream 306.

Each of the packed bed absorbers 302, 304 are similar to that described in connection with FIG. 2. Optionally, as shown in FIG. 2, gas may be injected below each of the packed beds in each of the packed bed absorbers 302, 304. In addition, the operation of each of the packed bed absorbers 302, 304 is similar to that described in connection with FIG. 2, including the optional use of a catalyst. Further, it should be appreciated that any type of gas/liquid contactor may be substituted for one or both of the packed bed absorbers 302, 304 shown, in FIG. 3.

One advantage of using a series of carbon dioxide absorbers is the ability to increase the amount of carbon dioxide removal. For example, if greater than 90%, or greater than 95%, or greater than 99% carbon dioxide removal is desired, the use of two carbon dioxide absorbers in series may be used to obtain such high removal percentages. In addition, the reagent used in each carbon dioxide absorber can be the same or different by using the same or different alkaline component. For example, in one embodiment the alkaline component 308 for the first packed bed absorber 302 may be calcium hydroxide, and the alkaline component 310 for the second packed bed absorber 304 may be sodium hydroxide. In this case, the reagents 312, 314 and the corresponding absorption solutions 316, 318 would have different compositions. This particular combination may be used when significantly high carbon dioxide removal percentages are desired. Alternatively, the alkaline components 308, 310 for use in each packed bed absorber 302, 304 may be the same (e.g., both may be sodium hydroxide or both may be calcium hydroxide), thereby giving the reagents 312, 314 and the absorption solutions 316, 318 the same composition, noting, however, that the quantity of carbon dioxide removal in each packed bed absorber 302, 304 may also affect the composition of the absorption solutions 316, 318.

As noted, a catalyst may be used in both of the packed bed absorbers 302, 304 or in one absorber only. As shown in FIG. 3, each packed bed absorber 302, 304 can be configured to add catalyst to the reagent feed tanks 320, 322 using chemical feed tanks 324, 326. Of course, the other options for adding the catalyst described above in connection with FIG. 2 are equally applicable here. If using a catalyst in both packed bed absorbers, 302, 304, the specific catalyst selected for use may be the same or different in each packed bed absorber 302, 304. Further, different catalysts may be used with different reagents or alkaline components. For example, a given catalyst may be used with calcium hydroxide as the alkaline component in the first packed bed absorber 302 and either that same catalyst or a different catalyst may be used with sodium hydroxide as the alkaline component in the second packed bed absorber 304. Alternatively, the same catalyst and the same alkaline component may be used in both packed bed absorber 302, 304, or all four of these components may be different. In other words, any combination of alkaline components and reagents may be used with any of the catalysts or combination of catalysts, and any of these combinations may be used in the first or second carbon dioxide absorber.

A further advantage of using two carbon dioxide absorbers is that the first absorber may be used to remove any residual sulfur dioxide from a gas stream prior to removing carbon dioxide. For example, a sulfur dioxide absorber may be used to remove sulfur dioxide from a flue gas stream generated by a coal-fired power plant. However, if that sulfur dioxide absorber does not remove a sufficient amount of sulfur dioxide, the first carbon dioxide absorber may be used to remove additional sulfur dioxide, as well as a portion of the carbon dioxide. The remaining carbon dioxide desired to be removed from the flue gas can be removed in the second carbon dioxide absorber. In this case, it should be appreciated that the alkaline component of the reagent in the first carbon dioxide absorber is used for both sulfur dioxide and carbon dioxide removal.

Figure 4:
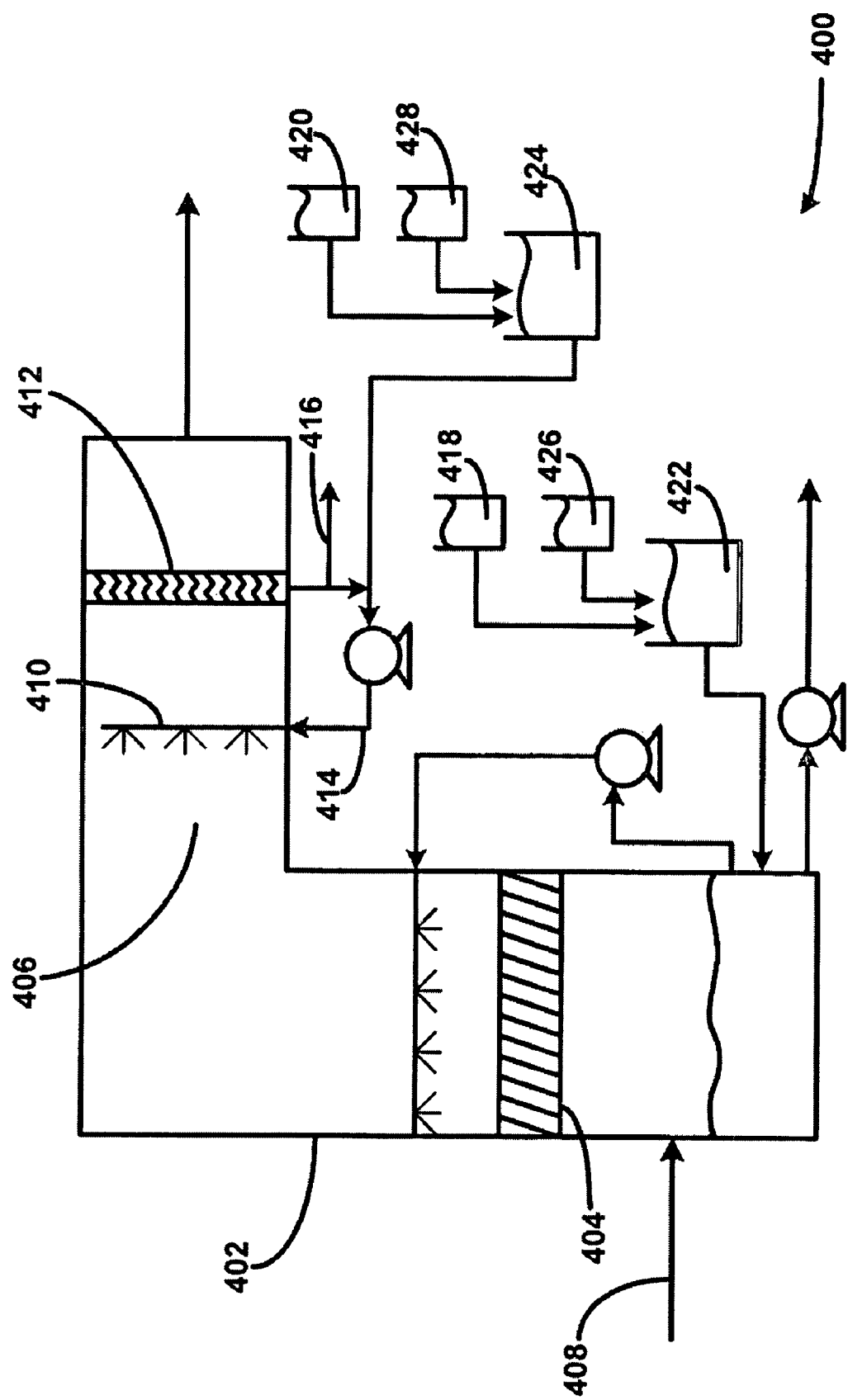
FIG. 4 illustrates a carbon dioxide absorber having a vertical stage and a horizontal stage for implementing another embodiment of the present invention.

FIG. 4 illustrates a carbon dioxide absorber having a vertical stage and a horizontal stage for implementing another embodiment of the present invention. In this process 400, instead of having two separate carbon dioxide absorbers, a single carbon dioxide absorber 402 having two separate absorption sections 404, 406 is used to provide two stages for carbon dioxide removal. In this case, a gas stream 408 comprising carbon dioxide enters the carbon dioxide absorber 402 and passes through the first or upstream absorption section 404 where a portion of the carbon dioxide is removed. The gas stream 408 then passes through the second or downstream absorption section 406 where an additional portion of the carbon dioxide is removed.

In one embodiment, the first or upstream absorption section 404 comprises a packed bed and the second or downstream absorption section 406 simply comprises an area in which absorption solution is sprayed into the gas stream through a bank of nozzles 410. Optionally, as shown in FIG. 2, gas may be injected below the packed bed of the first absorption section 404. The absorption solution in the second absorption section 406 is collected by a mist eliminator 412 and recycled to the bank of nozzles 410 through recycle line 414, from which a discharge or blow down stream 416 may be taken. It should be appreciated, however, that any type of gas/liquid contact equipment can be used in each of these sections. For example, the first absorption section 404 may be a spray tower and the second absorption section may be a packed bed. Similar to the use of two carbon dioxide absorbers described in connection with FIG. 3, each absorption section may use the same or different alkaline component 418, 420 in the reagent 422, 424. Also, catalysts 426, 428 may be added separately to either of the absorption sections 404, 406 with the reagents 422, 424 or by any other means as described above in connection with FIG. 2. Further, all of the various combinations of catalyst and alkaline components as described above in connection with FIG. 3 may be used as well for each absorption section 404, 406. Also, similar to the operation of the process 300 described in FIG. 3, this process 400 also allows for the combined removal of sulfur dioxide and carbon dioxide in the first stage or first absorption section 404. In most other respects, the operation of this carbon dioxide absorber 402, including recirculation of the absorption solution and blow down operations, is similar to those described in connection with FIG. 2 and 3.

Figure 5:
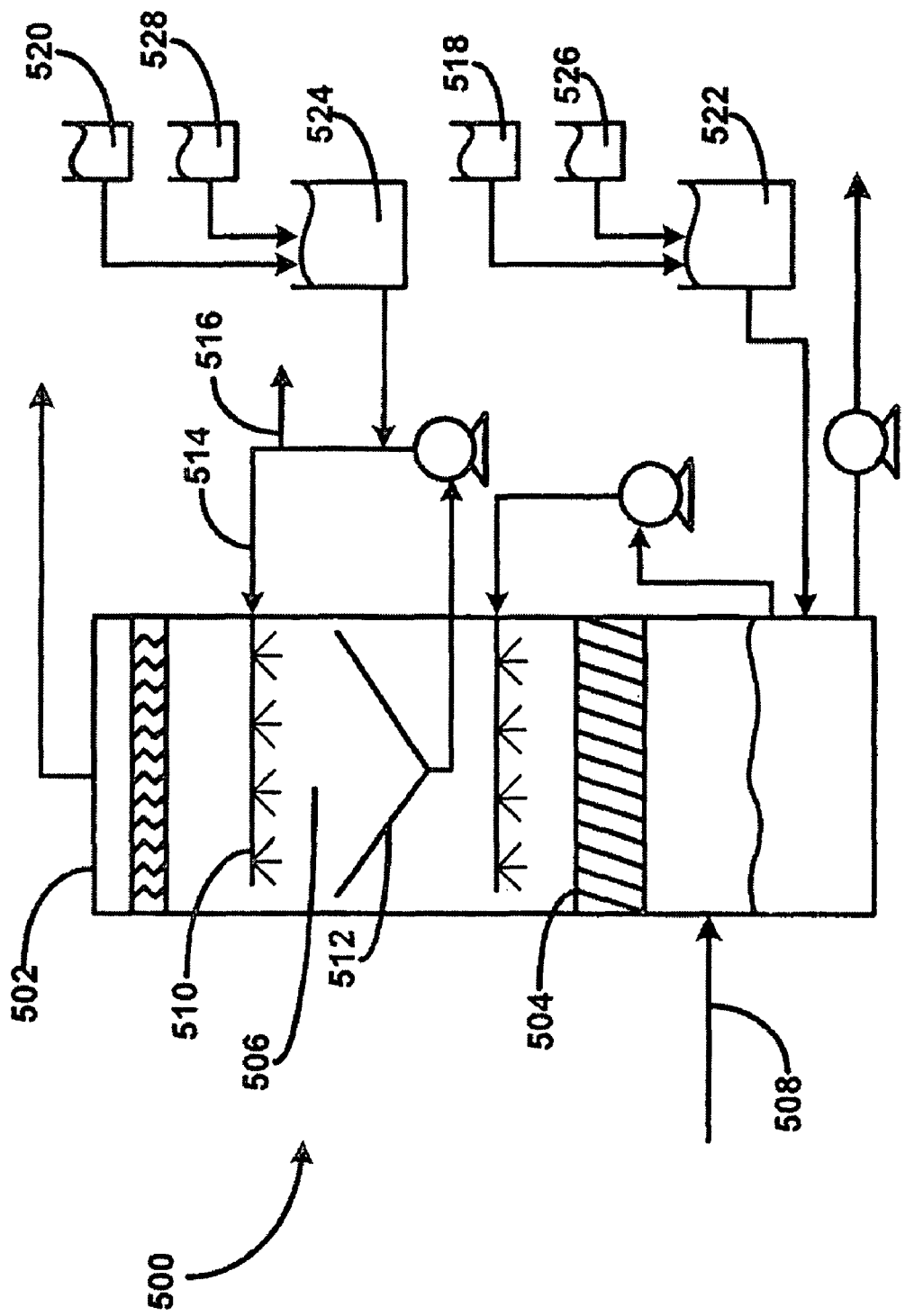
FIG. 5 illustrates a carbon dioxide absorber with two stages for implementing another embodiment of the present invention.

FIG. 5 illustrates a carbon dioxide absorber with two stages for implementing another embodiment of the present invention. In this process 500, the carbon dioxide absorber 502 and related process equipment is similar to that shown in FIG. 2 with the exception that the carbon dioxide absorber 502 comprises two absorption sections 504, 506. In this embodiment, contrary to that shown in FIG. 4, both absorption sections 504, 506 are designed for operation without a change in gas flow direction between the absorption sections 504, 506. In this case, a gas stream 508 comprising carbon dioxide enters the carbon dioxide absorber 502 and passes through the first or upstream absorption section 504 where a portion of the carbon dioxide is removed. The gas stream 508 then passes through the second or downstream absorption section 506 where an additional portion of the carbon dioxide is removed.

The first or upstream absorption section 504 is shown as a packed bed. Optionally, as shown in FIG. 2, gas may be injected below the packed bed of the first absorption section 504 to increase the amount of contact, between the gas and the liquid in the packed bed. The second or downstream absorption section 506 comprises a spray area into which absorption solution is sprayed into the gas 508 from a bank of nozzles 510. The absorption solution in this section 506 is collected by a collection device 512 and recycled to the bank of nozzles 510 through recycle line 514, from which a discharge or blow down stream 516 may be taken. It should be appreciated that a tank (not shown) may be necessary to hold the absorbing solution after it is collected and before it is recycled to the bank of nozzles 510. The collection device 512 may be any device capable of collecting the absorption solution or separating it from the gas stream, such as a funnel. It should be appreciated, however, that any type of gas/liquid contact equipment can be used in each of these sections and in any combination. For example, the first absorption section 504 may be a spray tower or a tray tower and the second absorption section 506 may be a packed bed, or both absorption sections may utilize the same type of gas/liquid contact equipment such as spray towers or sprays of absorbing solution or packed beds.

Similar to the use of two carbon dioxide absorbers described in connection with FIG. 3, each absorption section may use the same or different alkaline component 518, 520 in the reagent 522, 524. Also, catalysts 526, 528 may be added separately to either of the absorption sections 504, 506 with the reagents 522, 524 or by any other means as described above in connection with FIG. 2. Further, all of the various combinations of catalyst and alkaline components as described above in connection with FIG. 3 may be used as well for each absorption section 504, 506. However, it should be appreciated that the use of calcium hydroxide as the alkaline component may result in some scaling inside the carbon dioxide absorber 502. Therefore, if scaling is an issue during operation, it may be preferable to avoid the use of calcium hydroxide in the second absorption section 506. Also, similar to the operation of the, process 300 described in FIG. 3, this process 500 also allows for the combined removal of sulfur dioxide and carbon dioxide in the first stage or first absorption section 504. In most other respects, the operation of this carbon dioxide absorber 402, including recirculation of the absorption solution and blow down operations, is similar to those described in connection with FIG. 2 and 3.

Figure 5A:
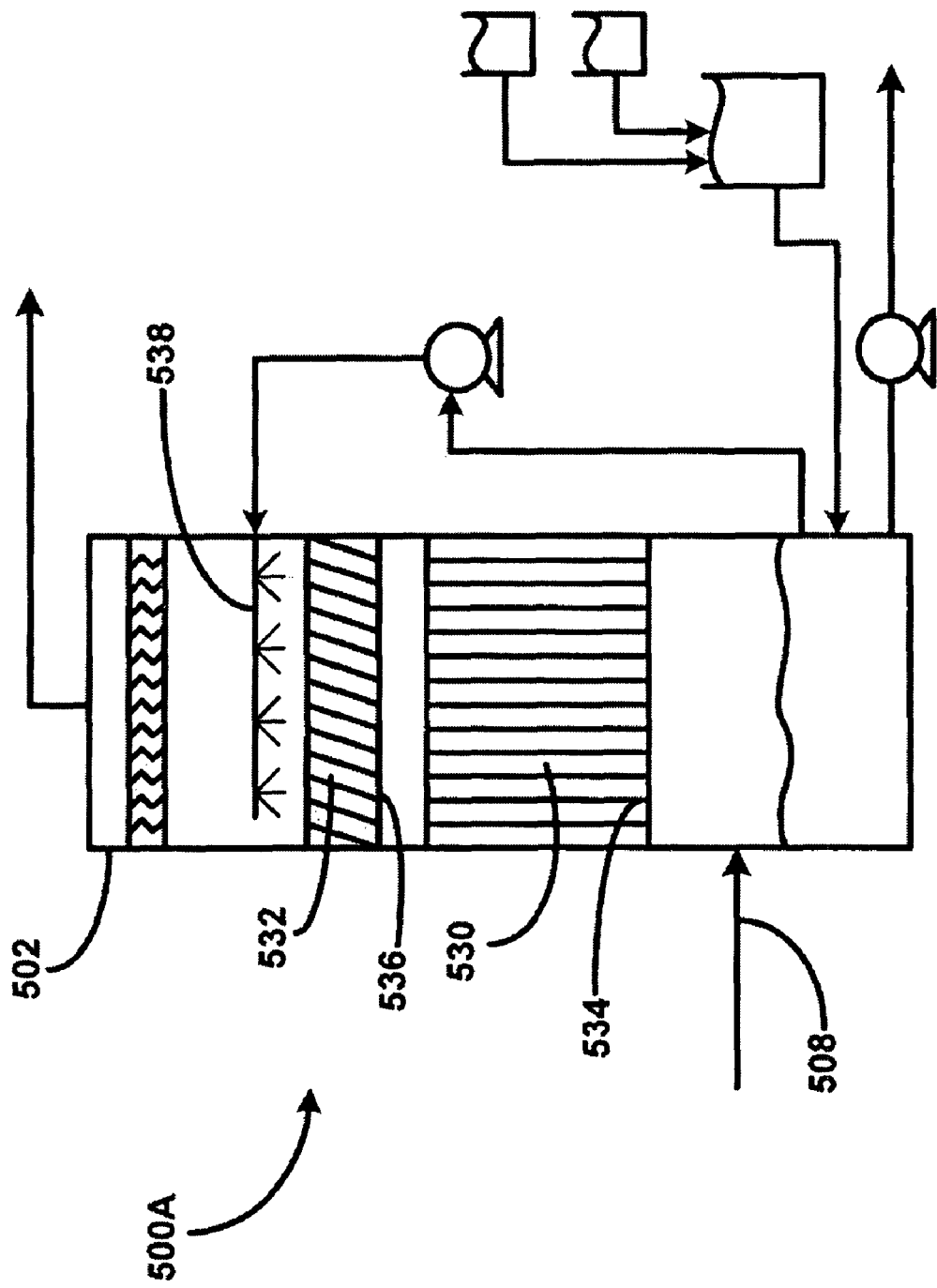
FIG. 5A illustrates another carbon dioxide absorber with two stages for implementing another embodiment of the present invention.

FIG. 5A illustrates another carbon dioxide absorber with two stages for implementing another embodiment of the present invention. In this process 500A, the carbon dioxide absorber 502 and related process equipment are similar to that shown in FIG. 2 with the exception that the carbon dioxide absorber comprises two absorption sections 530, 532. Similar to FIG. 5, the carbon dioxide absorber 502 and the two absorption sections 530, 532 are designed for operation without a change in the direction of gas flow. A gas stream 508 comprising carbon dioxide enters the carbon dioxide absorber 502 and passes through the first or upstream absorption section 530 where a portion of the carbon dioxide is removed. The gas stream 508 then passes through the second or downstream absorption section 532 where an additional portion of the carbon dioxide is removed.

In this particular embodiment, the first or upstream absorption section 530 comprises a wet electrostatic precipitator 534, and the second or downstream absorption section 532 comprises a packed bed 536. Optionally, as shown in FIG. 2, gas may be injected below the packed bed 536 of the second absorption section 532 to increase the amount of contact between the gas and the liquid in the packed bed 536.

During operation, the absorbing solution is pumped to a bank of nozzles 538 and distributed over the packed bed 536. The absorbing solution travels through the packed bed 536 and passes to the wet electrostatic precipitator 534. The absorbing solution then travels through the wet electrostatic precipitator 534. Accordingly, as the gas stream 508 passes through the wet electrostatic precipitator 534, a portion of the carbon dioxide in the gas stream 508 is removed by the absorbing solution passing through the wet electrostatic precipitator 534 in a counter-current manner. After exiting the wet electrostatic precipitator 534, the gas stream 508 passes through the packed bed 536, where an additional portion of carbon dioxide is removed from the gas stream 508. In this manner, the absorbing solution is only introduced into the carbon dioxide absorber at one location, namely downstream of the second absorption section 532.

Similar to the operation of the carbon dioxide absorber described in FIG. 2, any alkaline component or combination of alkaline components, with or without a catalyst or mixture of catalysts, may be used in this process 500A. Also, operation of this process 500A, including recirculation of the absorption solution and blow down operations, is similar to that described in connection with FIG. 2.

Figure 5B:
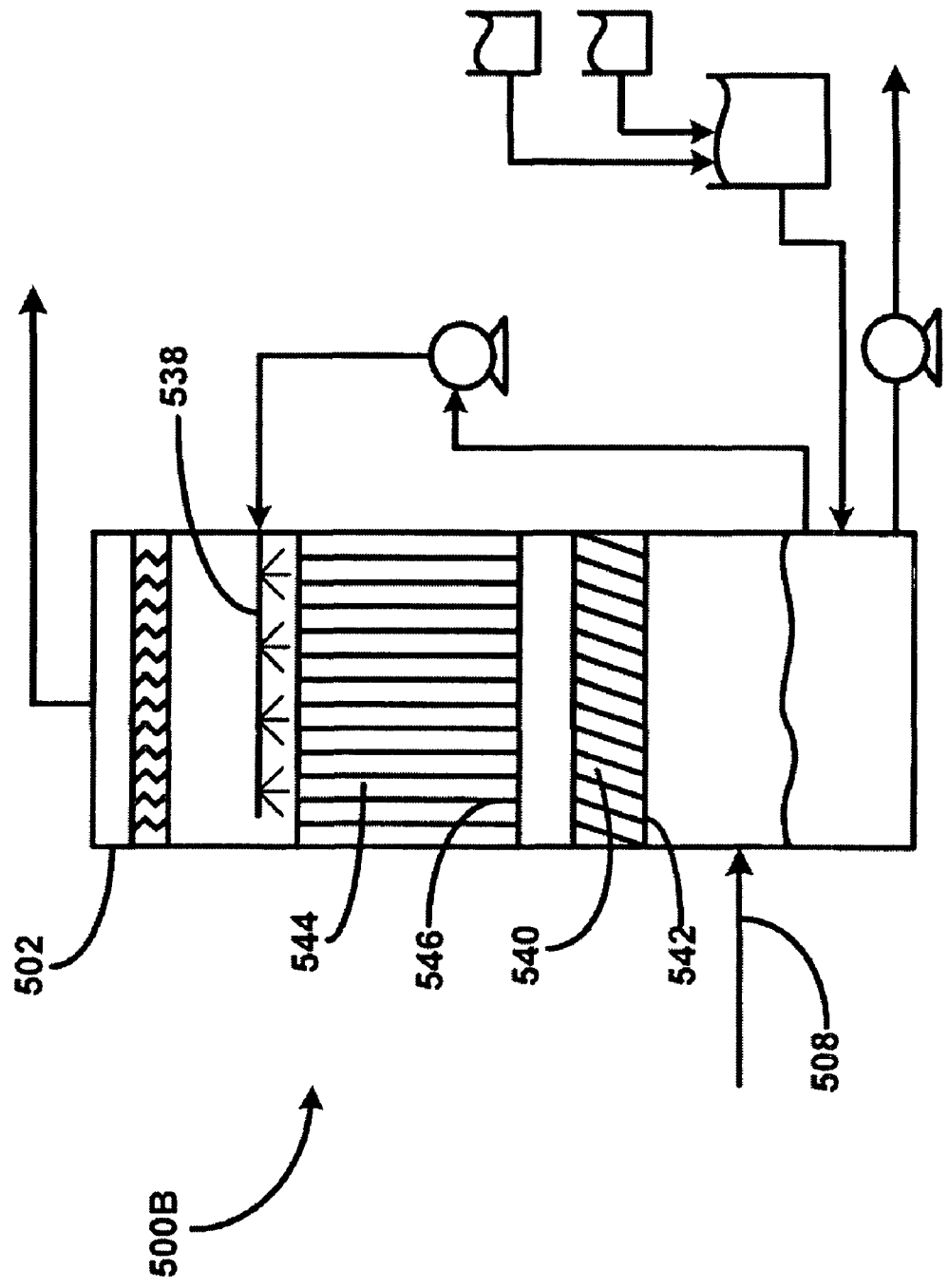
FIG. 5B illustrates another carbon dioxide absorber with two stages for implementing another embodiment of the present invention.

FIG. 5B illustrates another carbon dioxide absorber with two stages for implementing another embodiment of the present invention. This process 500B is similar to that described in FIG. 5A, with the exception that the upstream absorption section 540 comprises a packed bed 542 and the downstream absorption section 544 comprises a wet electrostatic precipitator 546. Optionally, as shown in FIG. 2, gas may be injected below the packed bed 542 of the upstream absorption section 540 to increase the amount of contact between the gas and the liquid in the packed bed 542.

The operation of this configuration is similar to that described in FIG. 5A, wherein the absorbing solution is introduced at a single location in the carbon dioxide absorber 502 that is downstream of the downstream absorption section 544. The absorbing solution is pumped to a bank of nozzles 538 and passed to, in this case, the wet electrostatic precipitator 546. The absorbing solution travels through the wet electrostatic precipitator 546 and passes to the upstream absorption section 540 and the packed bed 542. The absorbing solution then travels through the packed bed 542. Accordingly, as the gas stream 508 passes through the packed bed 542, a portion of the carbon dioxide in the gas stream 508 is removed by the absorbing solution passing through the packed bed 542. After exiting the packed bed 542, the gas stream 508 passes through wet electrostatic precipitator 546, where an additional portion of carbon dioxide is removed from the gas stream 508. It should be appreciated that using a wet electrostatic precipitator as the final downstream absorption section may reduce the need for a mist eliminator further downstream depending upon the amount of mist in the gas stream that needs to be removed before the gas exits the carbon dioxide absorber 202.

Similar to the operation of the carbon dioxide absorber described in FIG. 2, any alkaline component or combination of alkaline components, with or without a catalyst or mixture of catalysts, may be used in this process 500B. Also, operation of this process 500B, including recirculation of the absorption solution and blow down operations, is similar to that described in connection with FIG. 2.

Figure 5C:
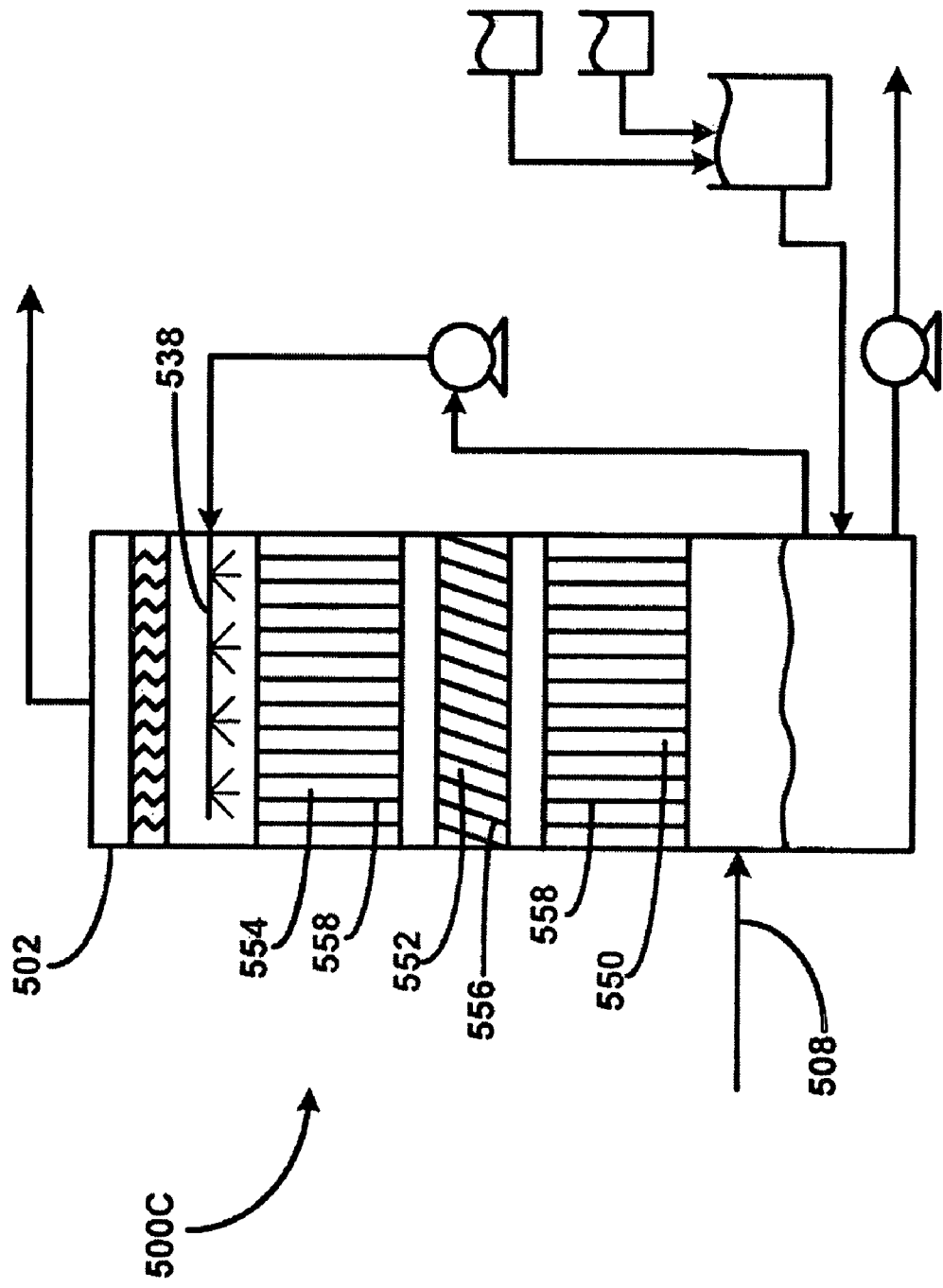
FIG. 5C illustrates another carbon dioxide absorber with multiple stages for implementing another embodiment of the present invention.

FIG. 5C illustrates another carbon dioxide absorber with multiple stages for implementing another embodiment of the present invention. This process 500C is similar to those described in FIGS. 5A and 5B, with the exception that there are essentially three absorption sections 550, 552, 554 created by the use of a packed bed 556 positioned within a wet electrostatic precipitator 558. It should be appreciated that although the packed bed 556 is disposed between the two sections of the wet electrostatic precipitator 558, both of these sections are electrically connected such that they function as a single wet electrostatic precipitator. In other words, both sections are operated as a single wet electrostatic precipitator even though they are physically separated by the packed bed 556. Optionally, as shown in FIG. 2, gas may be injected below the packed bed 556 to increase the amount of contact between the gas and the liquid in the packed bed 556.

The operation of this configuration is similar to that described in FIGS. 5A and 5B, wherein the absorbing solution is introduced at a single location in the carbon dioxide absorber 502 that is downstream of the last absorption section 554. The absorbing solution is pumped to a bank of nozzles 538 and passed to the downstream portion of the wet electrostatic precipitator 558. The absorbing solution exits the downstream portion of the wet electrostatic precipitator 558 and passes through the packed bed 556 in the middle absorption section 552. The absorbing solution exits the packed bed 556 and passes to and through the upstream portion of the wet electrostatic precipitator 558.

Accordingly, as the gas stream 508 passes first through the upstream portion of the wet electrostatic precipitator 558, a portion of the carbon dioxide in the gas stream 508 is removed by the absorbing solution passing through that portion of the wet electrostatic precipitator 558 in the upstream absorption section 550. After exiting the upstream portion of the wet electrostatic precipitator 558, the gas stream 508 passes through the packed bed 556, where an additional portion of carbon dioxide is removed from the gas stream 508 in the middle absorption section 552. Finally, after exiting the packed bed 556, the gas stream 508 passes through the downstream portion of the wet electrostatic precipitator 558, where yet an additional portion of carbon dioxide is removed from the gas stream 508 in the final absorption section 554. It should be appreciated that using a wet electrostatic precipitator as the final downstream absorption section may reduce the need for a mist eliminator further downstream depending upon the amount of mist in the gas stream that needs to be removed before the gas exits the carbon dioxide absorber 202.

Similar to the operation of the carbon dioxide absorber described in FIG. 2, any alkaline component or combination of alkaline components, with or without a catalyst or mixture of catalysts, may be used in this process 500C. Also, operation of this process 500C, including recirculation of the absorption solution and blow down operations, is similar to that described in connection with FIG. 2.

As described above in connection with FIG. 5C, it should be appreciated that a carbon dioxide absorber may have more than two absorption sections. For example, in another configuration with multiple absorption sections, the absorber may have multiple banks of spray nozzles that each deliver absorbing solution to different locations or positions within the absorber. In a vertically-oriented absorber, where the gas flow is from the bottom of the absorber to the top of the absorber, three or more banks of spray nozzles positioned at different heights along the absorber may be used. In this case, the area between each bank of spray nozzles and the area under the lowest bank of spray nozzles would each constitute an absorption section.

Figure 6:
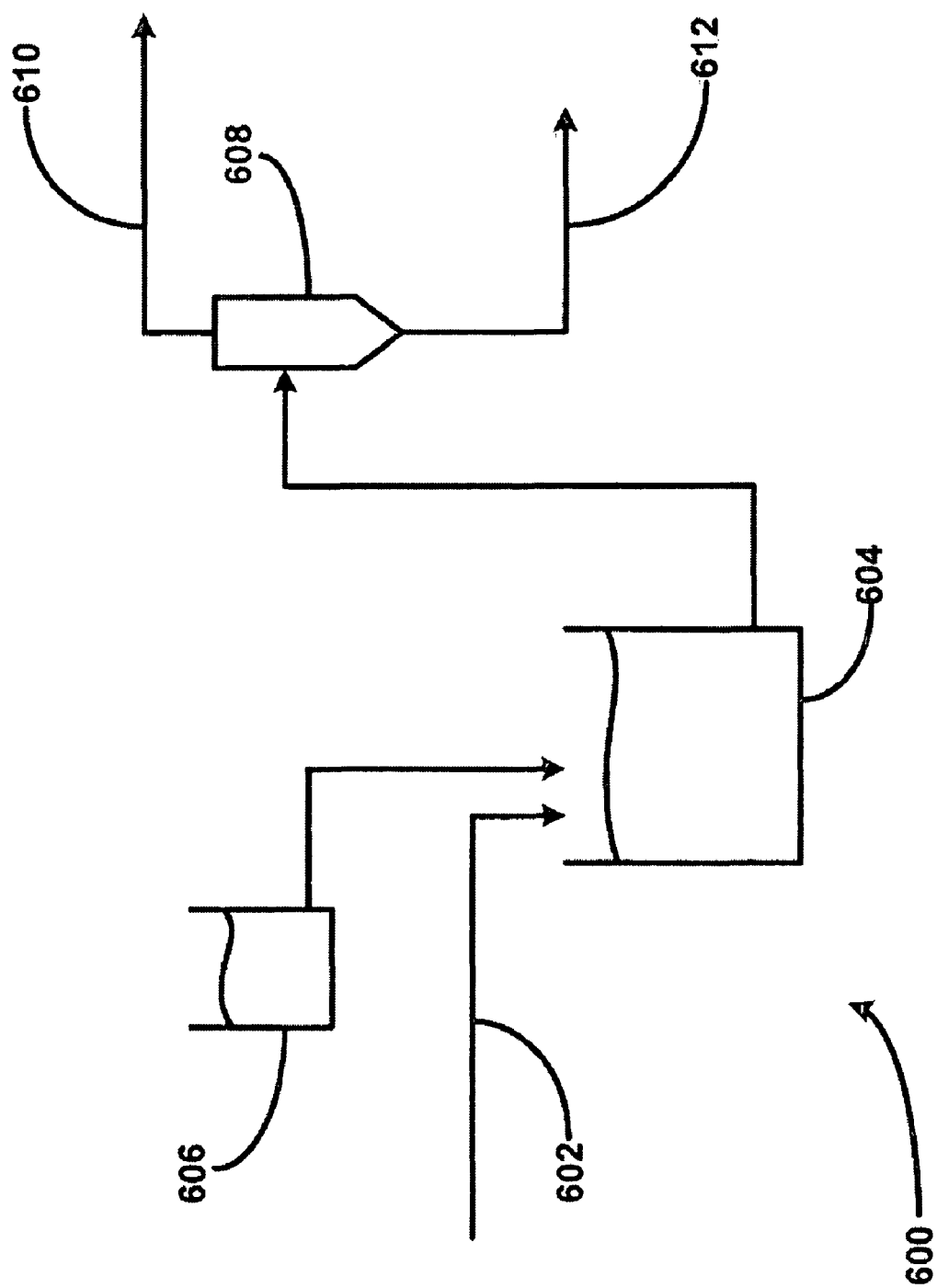
FIG. 6 illustrates a process for regenerating reagent for use in an embodiment of the present invention.

FIG. 6 illustrates a process for regenerating reagent for use in an embodiment of the present invention. In this embodiment 600, the discharge or blow down stream 602 comprising a portion of the absorption solution from any of the foregoing carbon dioxide absorbers or from any one of the stages from those carbon dioxide absorbers having two stages in which the alkaline component comprises at least sodium hydroxide is directed to a regeneration tank 604. A solution comprising calcium hydroxide is held in a feed tank 606 and fed to the regeneration tank 604, where it is mixed and reacted with the discharge stream 602. As noted above, in those embodiments in which the alkaline component of the reagent is sodium hydroxide, the absorption solution will contain sodium carbonate. This sodium carbonate is reacted with the calcium hydroxide in the regeneration tank 604 to regenerate the alkaline component sodium hydroxide and to produce calcium carbonate solids or limestone according to the following equation:

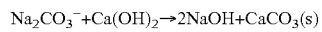

$$Na_2CO_3^- + Ca(OH)_2 \rightarrow 2NaOH + CaCO_3(s) \qquad \text{Eq. (7)}$$

The reaction products of sodium hydroxide and calcium carbonate solids in the regeneration tank 604 are passed to a liquid/solid separator 608, such as a hydrocyclone or other device that can reasonably separate-solids and liquids. The liquid solid separator 608 produces a liquid-rich stream 610 comprising sodium hydroxide and a solids-rich stream 612 comprising calcium carbonate solids. The liquid-rich stream 610 may-be recycled back to either a chemical feed tank that holds the alkaline component or to the reagent tank of any of the foregoing carbon dioxide absorber processes. This process 600 is particularly useful in those situations where the discharge or blow down stream cannot be easily disposed of, since the resulting solids-rich stream 612 comprising calcium carbonate solids can be easily disposed of. In addition, process economics are improved by reclaiming the sodium hydroxide.

In those embodiments where there are either two carbon dioxide absorbers or two separate absorption sections and where one of the absorbers or sections utilizes sodium hydroxide and where the other absorber or component utilizes calcium hydroxide as the alkaline component, the blow down streams preferably would not be mixed so that the sodium-based stream could be used in the regeneration process to regenerate sodium hydroxide. Alternatively, if both absorbers or both absorption sections utilize sodium hydroxide as the alkaline component, then the blow down streams from each could be combined and treated together in the regeneration process.

Various embodiments of the invention have been described above. The descriptions are intended to be illustrative of various embodiments of the present invention and are not intended to be limiting. It will be apparent to one of skill in the art that modifications may be made to the invention as described without departing from the scope of the claims set out below. For example, it is to be understood that although the various embodiments have been described in the context of a coal-fired boiler and the absorption of carbon dioxide from the corresponding flue gas, the methods and apparatuses of the various embodiments of the present invention may be applied to any gas stream from which it is desirable to remove carbon dioxide. It should also be appreciated that the present invention is adaptable to existing coal-fired flue gas systems that already comprise a sulfur dioxide scrubber. In this case, a carbon dioxide scrubber can be easily retrofit into such a system.

What is claimed is:

1. A method for removing at least a portion of carbon dioxide in a gas stream from a coal-fired boiler, comprising:
    contacting a gas stream from a coal-fired boiler comprising carbon dioxide with an alkaline liquid stream;
    absorbing at least a portion of the carbon dioxide into the alkaline liquid stream to produce absorbed carbon dioxide: and
    catalyzing a liquid phase reaction of the absorbed carbon dioxide to form bicarbonate and carbonate with a catalyst, wherein the alkaline liquid stream comprises the catalyst and wherein the catalyst comprises an aldehyde.

2. A method for removing at least a portion of carbon dioxide in a gas stream, comprising:
    contacting a gas stream comprising carbon dioxide with an alkaline liquid stream;
    absorbing at least a portion of the carbon dioxide into the alkaline liquid stream to produce absorbed carbon dioxide; and
    catalyzing a liquid phase reaction of the absorbed carbon dioxide to form bicarbonate and carbonate using a catalyst, wherein the catalyst comprises an aldehyde.

3. The method of claim 1, wherein said absorbing comprises absorbing at least a portion of the carbon dioxide into the alkaline liquid stream to produce bicarbonate and wherein said catalyzing comprising catalyzing the liquid phase reaction of the bicarbonate to carbonate.

4. The method of claim 2, wherein said absorbing comprises absorbing at least a portion of the carbon dioxide into the alkaline liquid stream to produce bicarbonate and wherein said catalyzing comprising catalyzing the liquid phase reaction of the bicarbonate to carbonate.

* * * * *